(12) United States Patent
Carr et al.

(10) Patent No.: US 7,394,553 B2
(45) Date of Patent: Jul. 1, 2008

(54) INTEGRATED MEASUREMENT DEVICE

(75) Inventors: Gary A. Carr, Fairfax, VA (US);
Christian Diaz, Falls Church, VA (US);
Arthur Lee Clouse, Washington, DC (US)

(73) Assignee: Ensco, Inc., Springfield, VA (US)

( * ) Notice: Subject to any disclaimer, the term of this patent is extended or adjusted under 35 U.S.C. 154(b) by 191 days.

(21) Appl. No.: 11/054,937

(22) Filed: Feb. 11, 2005

(65) Prior Publication Data

US 2005/0174582 A1 Aug. 11, 2005

Related U.S. Application Data

(60) Provisional application No. 60/543,403, filed on Feb. 11, 2004.

(51) Int. Cl.
*G01B 11/14* (2006.01)

(52) U.S. Cl. .................. 356/614; 33/338; 33/523.1

(58) Field of Classification Search ......... 356/614–623, 356/5.01; 250/559.38; 33/338, 366.14, 366.26, 33/523.1, 651.1
See application file for complete search history.

(56) References Cited

U.S. PATENT DOCUMENTS

| 1,329,197 | A | | 1/1920 | Matoba |
|---|---|---|---|---|
| 2,175,655 | A | | 10/1939 | Allen |
| 3,990,154 | A | | 11/1976 | Theurer |
| 4,027,397 | A | | 6/1977 | Theurer |
| 4,288,926 | A | | 9/1981 | Long |
| 4,477,184 | A | * | 10/1984 | Endo ................ 356/141.1 |
| 4,514,083 | A | * | 4/1985 | Fukuoka ............... 356/3.08 |
| 4,710,020 | A | * | 12/1987 | Maddox et al. .......... 356/3.13 |
| 4,786,815 | A | * | 11/1988 | Walker et al. ......... 250/559.38 |
| 5,025,566 | A | | 6/1991 | Fiechter |
| 5,036,594 | A | | 8/1991 | Kesler |
| 5,182,612 | A | * | 1/1993 | Rheme ................... 356/492 |
| 5,791,063 | A | | 8/1998 | Kesler |
| 5,848,476 | A | | 12/1998 | Grady |
| 5,930,904 | A | | 8/1999 | Mualem |
| 6,223,446 | B1 | | 5/2001 | Potter |
| 6,308,428 | B1 | | 10/2001 | Creighton |
| 6,397,130 | B1 | | 5/2002 | Carr |
| 6,405,141 | B1 | | 6/2002 | Carr |
| 6,897,465 | B2 | * | 5/2005 | Remillard et al. ...... 250/559.38 |
| 7,046,378 | B2 | * | 5/2006 | Muller ................... 356/614 |
| 2002/0166248 | A1 | | 11/2002 | Carr |

* cited by examiner

*Primary Examiner*—Hoa Q Pham
(74) *Attorney, Agent, or Firm*—Pillsbury Winthrop Shaw Pittman, LLP

(57) ABSTRACT

An integrated measurement device for taking gauge and cross-level measurements between two objects. The integrated measurement device includes at least an emitter/receiver unit, a sensor unit, and a microprocessor. In operation, the integrated measurement device is pivotably placed on the top of the first object such that a light emitted from the emitter/receiver unit travels along a surface of the second object as the device rotates about a pivot point of the first object. The sensor unit senses data associated with incident angles and traveling distances of the emitted light. Based on the data sensed by the sensor unit, the microprocessor calculates the incident angle, the traveling distance, and a distance between the first and second objects. The calculated values can also be transformed to (x, y) space coordinates that are used to describe a profile of the second object.

26 Claims, 4 Drawing Sheets

INTEGRATED MEASUREMENT DEVICE

DETAILED DESCRIPTION

This application claims the benefit of U.S. Provisional Application No. 60/543,403, filed Feb. 11, 2004, which is herein incorporated by reference in its entirety.

BACKGROUND

1. Field of the Invention

The present invention relates to a laser gauge and cross-level sensor apparatus, and more particularly, to an integrated measurement device for obtaining positional information associated with two objects.

2. Background of the Invention

Laser gauges and cross-levels are commonly used in the railroad industry for measuring geometrical characteristics of railroad tracks. The laser gauges have been developed for some time to facilitate railroad track alignment and/or track profile measurement. The laser gauges, which are used to measure the distance between the rails (gauge), can be mounted upon a railroad car and propelled along the track to be inspected. The laser gauges are operated to accurately sense track defects, variations in track profile and other track irregularities, which might result in dangerous condition. In addition to the laser gauges, cross-level sensors can be used to detect relative level differences which might result in rocking and ultimate derailment of a railroad car.

Typically, operators utilize separate laser gauges and cross-level sensors for the measurement of the railroad track. The most-commonly used cross-level sensors are solid bars connecting the left and the second rails. The bars are about 59-inch long, which can be barely fitted into the trunk of a car. Therefore, most people carry a tape measure instead of the gauge and ignore the cross-level measuring.

Accordingly, there is a need for an integrated unit that includes laser gauge and cross-level. Preferably, the integrated unit is a handheld device that is compact enough to be carried by users in a pocket.

BRIEF SUMMARY OF THE INVENTION

Embodiments of the present invention relate to an integrated measurement device that includes both laser gauge and cross-level sensor for measuring the distance and level between two objects, such as rails of a railroad. The device combines a laser gauge and a cross-level in one. Preferably, the device is compact so that a user can conveniently carry the device in his/her pocket.

In accordance with a first embodiment of the invention, a system for measuring a gauge and a cross-level between a first object and a second object is provided. The system includes an emitter/receiver unit for emitting a light from the first object to the second object and for receiving the light reflected from the second object, a sensing unit for sensing data including an incident angle and a traveling distance of the emitted light, and a microprocessor for calculating a distance between the first object and the second object based on the incident angle and the traveling time sensed by the sensing unit.

The emitter/receiver unit and the sensing unit is placed on the top of the first object. Preferably, the emitter/receiver unit is rotatable about a position or location of the first object so that the light emitted by the emitter/receiver unit can move along a surface of the second object from the bottom to the top in a controlled sweeping motion. The controlled sweeping motion can be either controlled on a time basis or on an angle basis.

In accordance with a second embodiment of the present invention, the integrated measurement device includes an emitter/receiver unit for emitting a light from the first object to the second object and for receiving the light reflected back from the second object, a sensing unit for measuring data associated with an incident angle and a traveling time of the emitted light between being emitted to the second object and being received by the first object, a microprocessor for calculating parameters including a traveling distance and the incident angle of the emitted light based on the data measured by the sensing unit, and a database for storing the calculated parameters.

In operation, the integrated measurement device is pivotably mounted on the top of the first object and is rotatably about the second object in a controlled sweeping motion. In the context of railroad application, the first and second objects are first and second rails. The sensing unit records all of the data during the controlled sweeping motion and the microprocessor uses the data to calculate a relative angle between a horizontal line of the top surfaces of the rails and a traveling direction of the light to a position about a five-eighth of an inch down from the top surface of the second rail, and wherein the microprocessor calculates the distance between the first and second rails from the relative angle.

The integrated measurement device further includes a display for displaying the relative angle and the distance between the first and second rails.

In accordance with a third embodiment of the present invention, a method for measuring a gauge and a cross-level information between an first object and a second object is provided. The method includes emitting a laser light from the first object to the second object and receiving the laser light reflected from the second object, sensing data associated with an incident angle of the emitted laser light and a traveling time of the emitted laser light between being emitted to the second object and being received by the first object, and calculating parameters including the incident angle and the traveling distance of the emitted light and the distance between the first and second objects based on the sensed data.

Figure 1:
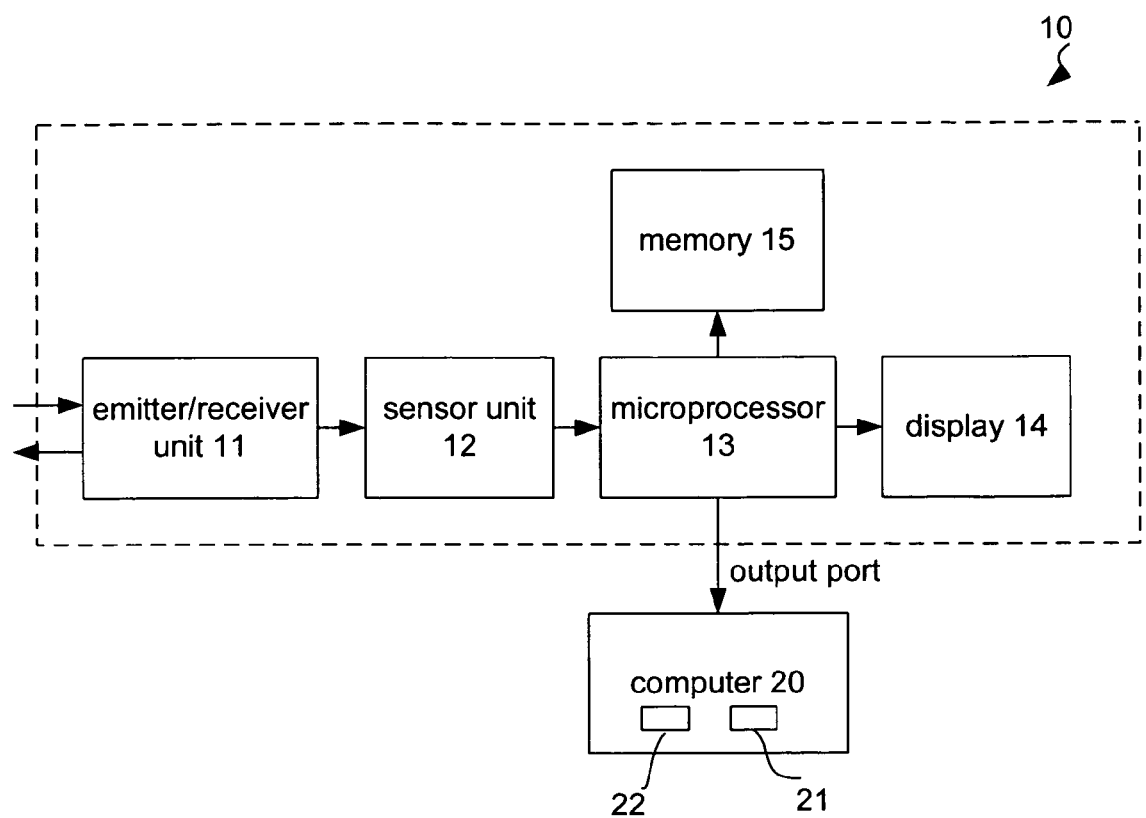
FIG. 1 is a block diagram of an exemplary integrated measurement device in accordance with the present invention.

Before one or more exemplary embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

FIG. 1 shows an exemplary block diagram of an integrated measurement device in accordance with one embodiment of the invention. According to the present invention, device 10 combines the functions of a laser gauge and a cross-level for, respectively, measuring a distance (i.e., gauge) and a difference in height (or elevation) of two objects, such as two rails of a railroad track. Device 10 may be a digital device and may be as small as a pocket-size apparatus.

As shown in FIG. 1, device 10 includes emitter/receiver unit 11, sensor unit 12, microprocessor 13, and display unit 14. Emitter/receiver unit 11 emits a light to an object to be measured and receives reflected light from the object. Sensor unit 12 detects certain signals, such as the time difference between emitting the light and receiving the light and an angle of the incident light to the object. Sensor unit 12 then outputs such signals to microprocessor 13 for calculation. Microprocessor 13 then analyzes the signals, according to a built-in algorithm, to obtain measurement data and outputs the measurement data to display unit 14 for display. In the embodiment of FIG. 1, display unit 14 includes only one display. Display unit 14, however, may include two displays (not shown) for displaying gauge and level measurement results separately.

Device 10 may further include memory 15 for storing the measurement data. In another preferred embodiment of the invention, the stored measurement data can later be output to computer 20 through an output port for further processing. Computer 20 may store the measurement data in database 21 and display the data on display 22. Preferably, computer 20 further determines a profile of the measured object according to the measurement data. Preferably, microprocessor 13 of device 10 may also determine the profile of the measured object according to the measurement data. In this case, the profile is displayed on display 14 and stored in memory 15. When connected with computer 20, the measurement data and determined profile are both output to computer 20. In a further embodiment, device 10 may only include emitter/receiver unit 11 and sensor unit 12 and is connected with computer 20. The signals detected by sensor unit 12 are coupled to computer 20 for calculation the measurement data and profile.

Figure 2:
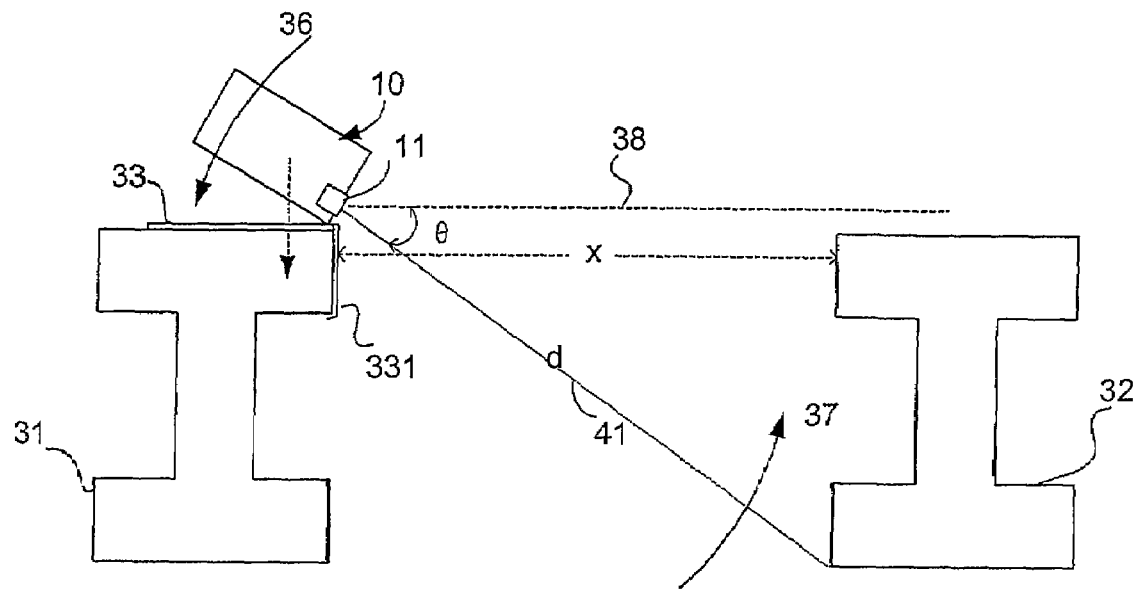
FIG. 2 is a schematic diagram showing an initial position of an integrated measurement device when used in measuring the distance between two objects in accordance with the present invention.
Figure 3:
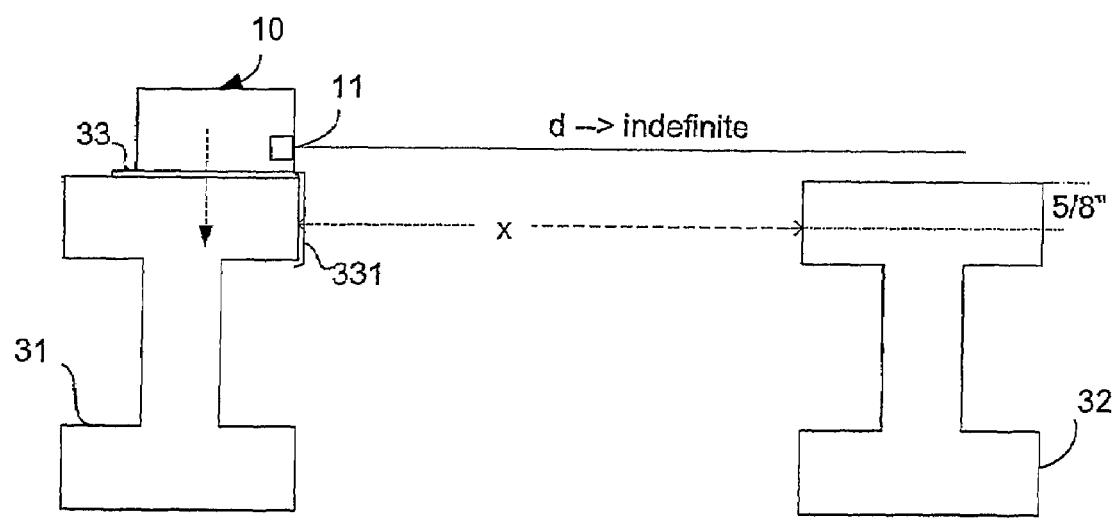
FIG. 3 is a schematic diagram showing a final position of an integrated measurement device when used in measuring the distance between two objects in accordance with the present invention.

FIGS. 2 and 3 illustrate the operation of device 10 when used in measuring gauge and level of the pair of railroad rails. In operation, device 10 is placed on a top of a first object (e.g., first rail 31) that is supposed to be aligned with a second object (e.g., second rail 32). In this context, the gauge is defined as the actual distance x between second rail 32 and first rail 31 and the level is defined as the angle θ shown in FIG. 2. Preferably, device 10 is pivotably mounted on platform 33 that is placed on the top of first rail 31 and is fixed to first rail 31 via clip 331. Therefore, device 10 is pivotably movable about platform 33 and first rail 31 when in use. Device 10 may also be simply pivotably mounted on first rail 31 via a hook only (such as hook 331). Any other suitable mounting devices that secure device 10 to first rail 31 and allow device 10 pivotably moves about first rail 31 can be used.

At an initial position (t=0), device 10 aims at the bottom of second rail 32. At the time, emitter/receiver unit 11 emits a laser light in the direction of second rail 32, such as direction 41. The laser light, after hitting a surface of second rail 32, is reflected back. When device 10 receives the light reflected from the surface of second rail 32, device 10 sends data sensed by sensor unit 12 to microprocessor 13. According to the sensed data, microprocessor 30 then calculates traveling distance d of the light from second rail 31 to first rail 32 and angle θ (i.e., an incident angle) between the incident light and a horizontal surface shown in dash line 38 of first rail 32. As described above, the calculation of distance d and angle θ can also be performed on computer 20. The calculated results are next recorded in memory 15. The calculations of distance d and angle θ will be described below with reference to FIG. 4. According to the measured data d and θ, distance x between the pair of rails can be calculated, which will also be described in details below.

Next, device 10 rotates toward the top of second rail 32, as shown by arrow 36, to obtain measurement data at different positions on second rail 32. As device 10 moves in direction 36, the light emitted from device 10 moves in direction 37. According to one preferred embodiment, the movement of device 10 is in a controlled sweeping motion that is based on either predetermined time intervals (Δt) or predetermined angle segments (Δθ). Therefore, the measured distance d and measured angle α can be either a function of time, i.e., d(t) and θ(t) or a function of angle, i.e., d(θ) and θ(θ). In either case, device 10 continues measuring distance d and angle θ at short intervals that is either time- or angle-triggered and records these measured data in memory 15.

Device 10 is preferably continuously rotated until no light is reflected back from second rail 32. For example, in FIG. 3, as device 10 points at a position higher than the top surface of second rail 32, the light emitted by device 10 does not hit second rail 32 and thus no reflected light would be received by device 10. When this happens, the measured data d is indefinite.

All of the measured data d(t) and θ(t) obtained at different positions are recorded in memory 15 or 21 and analyzed by device 10. As commonly practiced in the railroad industry, the actual distance between rails 31 and 32 (distance x) and the relative angle (see $θ_2$ of FIG. 5) between horizontal line 38 of the top surfaces of rails 31 and 32 and the distance d measured at a position of a five-eighth inch down from the top surface of rail 32 are the most important data for determining the damage level of the railroad. Accordingly, device 10 need not calculate the actual distance x(t) between first rail 31 and second rail 32 at every measured position. Preferably, device 10 calculates and displays the actual distance x at the position of five-eighth inch down from the top of the rail and angle θ of the top surfaces of the two rails after all of the measurements are done and recorded. All of the recorded measured data, however, may be forwarded to a database of a central computer (not shown) to document the measurement of gauge and cross-level and to calculate the profile of the measured rail. Storing the measured data allows determination of the rail profile, such the shape of the rail. This profile may be then compared against known profiles (e.g., provided by manufacturers of the rails) to determine actual rail size, rail surface wear, and rail gauge wear.

Figure 4:
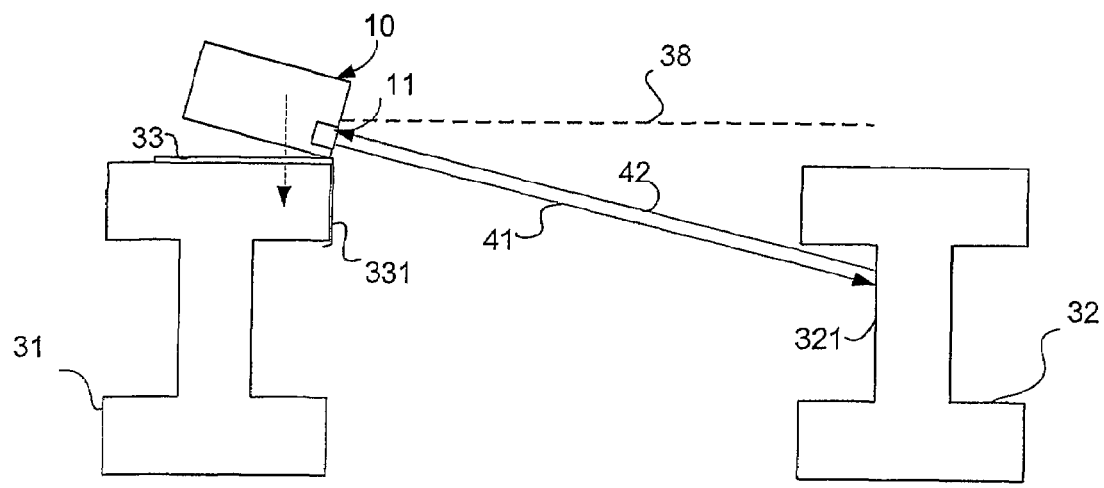
FIG. 4 is a schematic diagram showing the measurement of a traveling distance d of an emitted light using an exemplary integrated measurement device of the present invention.

FIG. 4 is a schematic diagram showing the measurement of the distance d by the integrated measurement device of the present invention. According to the present invention, the traveling distance d of the light can be calculated by measuring the time (t) elapsed between sending the light and receiving the light reflected from second rail 32. As shown in FIG. 4, emitter/receiver unit 11 emits light 41 and receives reflected light 42 from surface 321 of second rail 32 after a time period t. As the total traveling distance of light 41 is 2d and the traveling speed is c, the distance d can be calculated by the following equation:

$$d = t \times c/2, \text{ c is the speed of light.}$$

Furthermore, by sensing the direction of gravity of device 10 at this measured position, angle θ between the incident light 41 and horizontal surface 38 of first rail 32 is measured.

The method of calculating the actual distance x between the top surfaces of the second rail and the first rail will be described with reference to FIG. 5, which is a schematic diagram showing the relationship of the distance x with the traveling distance d and angle θ.

To determine the actual distance x, the method first reads the measurement data d(t) and θ(t) recorded in memory 15 of device 10 to find angle $\theta_1$ that corresponds to the measured position where the measured distance d(t) is indefinite. Based on the angle $\theta_1$, angle $\theta_2$ that is the relative angle between an five-eighth inch down from the top of rail 32 and horizontal surface 38 of the distance x can be calculated by the following equation:

$$\theta_2(t) = \theta(t) - \theta_1 \quad (1)$$

Figure 5:
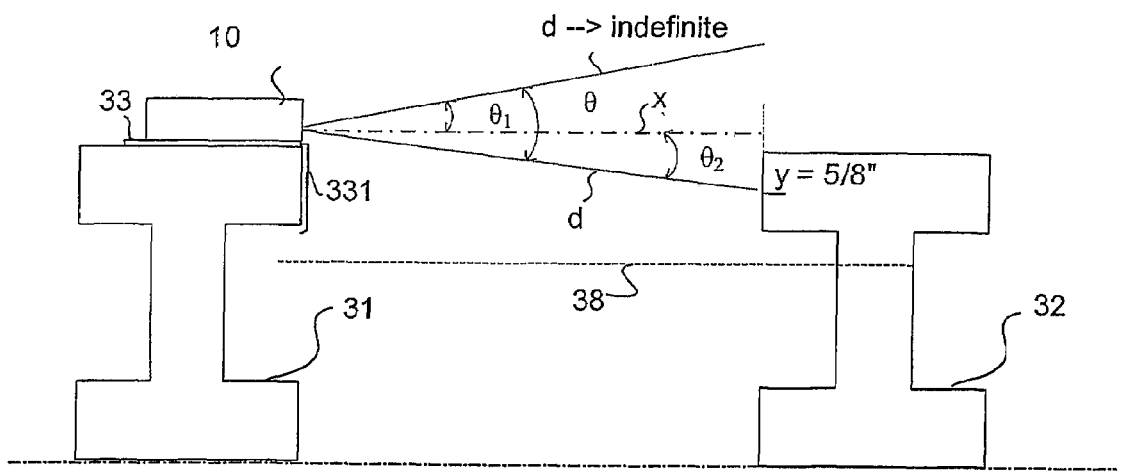
FIG. 5 is a schematic diagram showing the relationship of the distance x between a first rail and a second rail with the traveling distance d of an emitted light and incident angle $\theta$ of the emitted light in accordance with the present invention.

Furthermore, as shown in FIG. 5, distances x and y can be calculated by the following equation:

$$x(t) = d(t)\cos\theta_2(t) \quad (2)$$

$$y(t) = d(t)\sin\theta_2(t) \quad (3)$$

wherein x(t) is the actual distance between the top surfaces of first rail 31 and second rail 32 and y(t) is the distance between the top surface of second rail 32 to the point where the light 41 hits the second rail 32.

As described above, the relative angle $\theta_2$ between horizontal line 38 of the top surfaces of rails 31 and 32 and light 41 traveling to the position of a five-eighth inch down from the top surface of rail 32 is a critical data for determining the damage level of the railroad. Therefore, the value y(t) is set to {fraction (5/8)} inch. Similarly, measurement data d and $\theta_2$ that correspond to y(t)={fraction (5/8)} inch can be found from the recorded data. Once data d and $\theta_2$ are known, the actual distance x can be calculated from the above equation (2).

Furthermore, based on the above equations (2) and (3), all of the measurement data d(t) and θ(t) can be transformed to (x, y) space coordinates. These (x, y) coordinates can be further depicted to generate a rail profile.

Figure 6B:
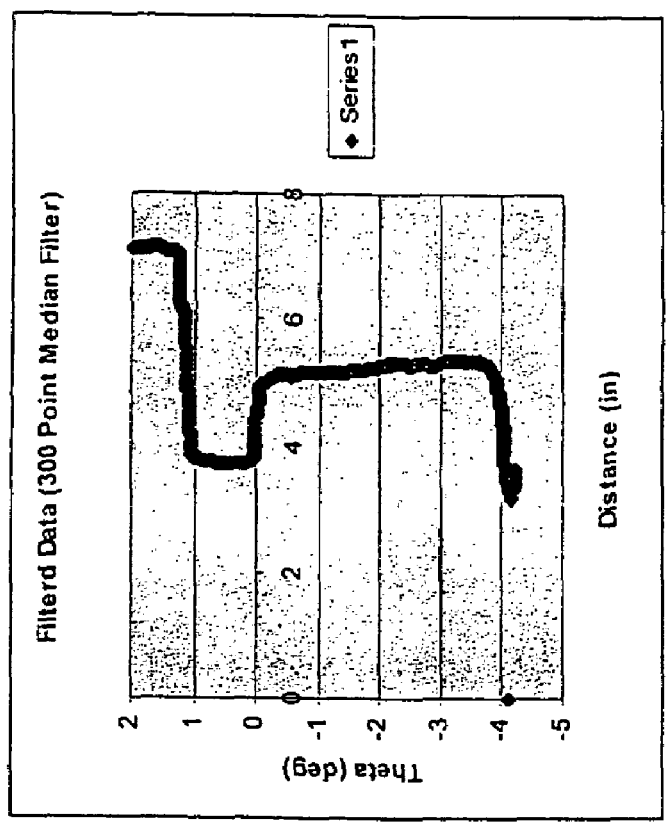
FIGS. 6A and 6B are exemplary rail profiles that are obtained by the measurement data d(t) and $\theta(t)$ measured by an exemplary integrated measurement device of the present invention.
Figure 6A:
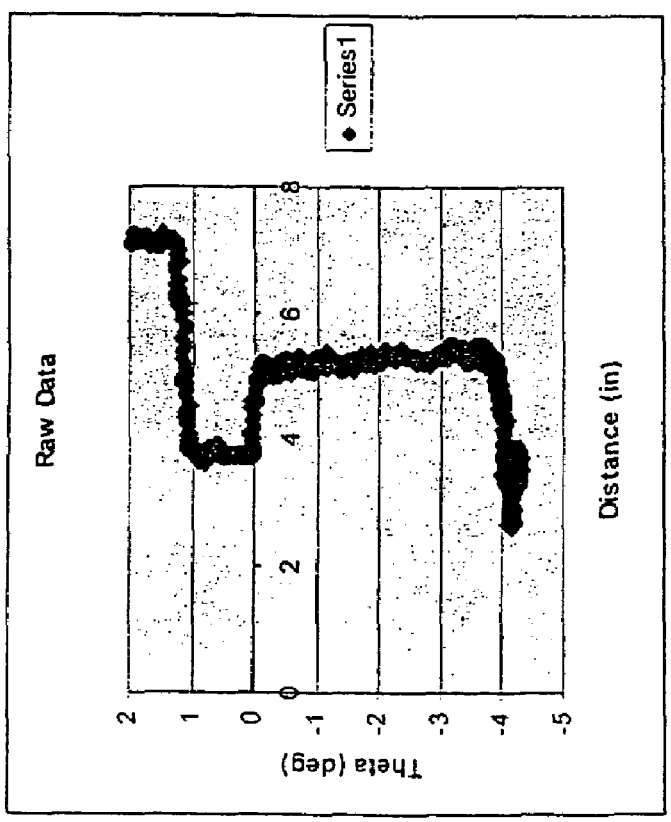

FIGS. 6A and 6B are exemplary rail profiles that are obtained by the measurement data d(t) and θ(t). It is noted that FIG. 6A is a raw profile diagram of rail 32 before filtering and FIG. 6B is a fine profile diagram of rail 32 after filtering. In accordance with the present invention, the rail profile may be used to compare with known profiles that are provided by manufacturers of the rails and may be stored in a database as a reference profile that can be used later to compare with new measured profiles.

In view of the above, the integrated measurement device combines the functions of a laser gauge and a cross-level and is compact in size in comparison with conventional gauge and cross-level apparatuses. Further, the integrated measurement device of the present invention does not have to be used in a stationary condition. The same approach can be used on a moving vehicle with a laser, encoder, and level sensor. In this case, it eliminates the need for a beam supporting two sensors as currently done. A single support relative to one rail and a custom sensor can determine the cross-level, gauge, and rail shape of the track.

Embodiments of integrated laser gauge and cross-level sensors have been described. The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for measuring a gauge and a cross-level between a first object and a second object, comprising:
    an emitter/receiver unit configured to emit a light from a location associated with the first object to a surface of the second object and configured to receive the light reflected from the second object,
    a sensing unit configured to sense data including an incident angle and a traveling distance associated with the emitted light; and
    a microprocessor configured to calculate a distance between the first object and the second object based on the data sensed by the sensing unit, wherein the position of the first object and the position of the second object is preset.

2. The system of claim 1, wherein the location is a top surface of the first object, and wherein the microprocessor is further configured to calculate the cross-level between the first object and the second object.

3. The system of claim 1, wherein the emitter/receiver unit initially emits the light to the base of the second object.

4. The system of claim 1, wherein the emitter/receiver unit is configured to rotate about a pivot point of the first object in a controlled sweeping motion such that the emitted light travels along the surface of the second object.

5. The system of claim 4, wherein the controlled sweeping motion is controlled on a time basis.

6. The system of claim 4, wherein the controlled sweeping motion is controlled on an angle basis.

7. The system of claim 1, wherein the emitter/receiver unit is configured to rotate about a pivot point of the first object in a controlled sweeping motion such that the emitted light travels along the surface of the second object, and wherein all of the data detected by the sensing unit during the controlled sweeping motion are recorded.

8. The system of claim 7, wherein the recorded data is forwarded to a database for documenting.

9. The system of claim 7, wherein all of the detected data are transferred to (x, y) coordinates that are used to describe a profile of the second object.

10. The system of claim 1, wherein the first object is a first rail of a railroad track and the second object is a second rail of the railroad track.

11. The system of claim 10, wherein the microprocessor further calculates a relative angle between a horizontal line of the top surfaces of the first rail and the second rail and a traveling direction of the emitted light to a position about five-eighth of an inch down from the top surface of the first rail, and wherein the microprocessor calculates the distance between the first rail and the second rail from the relative angle.

12. An integrated measurement device for measuring a gauge and a cross-level between a first object and a second object, comprising:
- an emitter/receiver unit configured to emit a light from a position associated with the first object to the second object and configured to receive the light reflected back from the second object;
- a sensing unit configured to measure data associated with the incident angle of the emitted light and a traveling time of the emitted light between being emitted to the second object and being received by the first object;
- a microprocessor configured to calculate parameters including the incident angle and a traveling distance of the emitted light based on the data measured by the sensing unit, wherein the position of the first object and the position of the second object is preset; and
- a database for storing the parameters calculated by the microprocessor, wherein the microprocessor further calculates a distance between the first object and the second object based on the stored data.

13. The integrated measurement device of claim 12, further comprising a display for displaying at least one of the incident angle and the distance between the first object and the second object.

14. The integrated measurement device of claim 12, wherein the microprocessor further calculates a relative angle between a horizontal line of the top surfaces of the first object and the second object and a traveling direction of the light to a position about five-eighth of an inch down from the top surface of the second object.

15. The integrated measurement device of claim 12, wherein the device is pivotably mounted on the top of the first object and the emitted light travels along a surface of the second object in a controlled sweeping motion.

16. The integrated measurement device of claim 15, wherein the sensing unit measures data during the controlled sweeping motion and records all of the measured data in the database.

17. The integrated measurement device of claim 15, wherein the sensing unit measures data during the controlled sweeping motion and the microprocessor calculates the traveling distances and the incident angles of the emitted light during the controlled sweeping motion based on the measured data.

18. The integrated measurement device of claim 12, wherein the device is pivotably mounted on the top of the first object via a hook.

19. The integrated measurement device of claim 12, wherein the device is pivotably mounted on a platform that is securely placed on the top of the first object.

20. The integrated measurement device of claim 12, wherein the emitter/receiver unit directs the emitted light from a bottom of the second object to the top of the second object as the emitter/receiver rotates about the position.

21. A method for measuring a gauge and a cross-level between a first object and a second object, comprising:
- emitting a laser light from a position associated with the first object to a surface of the second object and receiving the laser light reflected from the second object, wherein the position of the first object and the position of the second object is preset;
- sensing data associated with an incident angle of the emitted laser light and a traveling time of the emitted laser light between being emitted to the second object and being received by the first object; and
- calculating parameters including the incident angle, the traveling distance of the emitted laser light, the distance between the first and second objects based on the sensed data and the cross-level between the first and second objects based on the sensed data.

22. The method of claim 21, wherein the traveling distance of the emitted laser light is calculated from the equation below:
$2d = t \times C$, wherein d is the traveling distance of the laser light from the first object to the second object, t is the time duration of the laser light from being emitted to being received, and C is the light velocity.

23. The method of claim 21, wherein the incident angle of the emitted laser light is calculated in the direction of gravity sensed by a gravity sensor.

24. The method of claim 21, further comprising emitting the laser light to the second object in a controlled sweeping motion such that the emitted laser light travels along the surface of the second object.

25. The method of claim 21, where the calculated parameters are transferred into (x, y) coordinates that are used to depict a profile of the object.

26. A method for measuring a gauge and a cross-level between a first object and a second object, comprising:
- emitting a laser light from a position associated with the first object to a surface of the second object and receiving the laser light reflected from the second object, wherein the first and second objects are first and second rails of a railroad track;
- sensing data associated with an incident angle of the emitted laser light and a traveling time of the emitted laser light between being emitted to the second object and being received by the first object; and
- calculating parameters including the incident angle and the traveling distance of the emitted laser light, the distance between the first and second objects based on the sensed data and the cross-level between the first and second objects based on the sensed data.

* * * * *